United States Patent
Chen et al.

(10) Patent No.: US 9,546,098 B2
(45) Date of Patent: Jan. 17, 2017

(54) METHOD FOR PREPARING ALUMINUM-ZIRCONIUM-BORON ALLOY AND SYNCHRONOUSLY PREPARING CRYLITE

(71) Applicant: SHENZHEN SUNXING LIGHT ALLOYS MATERIALS CO., LTD, Shenzhen, Guangdong (CN)

(72) Inventors: Xuemin Chen, Guangdong (CN); Jun Yang, Guangdong (CN); Zhihong Li, Guangdong (CN); Weiping Wu, Guangdong (CN); Shiming Wei, Guangdong (CN)

(73) Assignee: SHENZHEN SUNXING LIGHT ALLOYS MATERIALS CO., LTD., Shenzhen, Guangdong (CN)

( * ) Notice: Subject to any disclaimer, the term of this patent is extended or adjusted under 35 U.S.C. 154(b) by 80 days.

(21) Appl. No.: 14/416,674

(22) PCT Filed: Nov. 26, 2012

(86) PCT No.: PCT/CN2012/085285
§ 371 (c)(1),
(2) Date: Jan. 23, 2015

(87) PCT Pub. No.: WO2014/015596
PCT Pub. Date: Jan. 30, 2014

(65) Prior Publication Data
US 2015/0175436 A1    Jun. 25, 2015

(30) Foreign Application Priority Data

Jul. 25, 2012 (CN) .......................... 2012 1 0259144

(51) Int. Cl.
| | | |
|---|---|---|
| *C01F 7/54* | (2006.01) |
| *C22C 21/00* | (2006.01) |
| *C22C 1/00* | (2006.01) |
| *C25C 3/18* | (2006.01) |
| *C22B 21/06* | (2006.01) |
| *C22C 1/02* | (2006.01) |
| *C25C 3/06* | (2006.01) |

(52) U.S. Cl.
CPC ............... *C01F 7/54* (2013.01); *C22B 21/062* (2013.01); *C22C 1/026* (2013.01); *C22C 21/00* (2013.01); *C25C 3/06* (2013.01); *C25C 3/18* (2013.01)

(58) Field of Classification Search
CPC ............ C01F 7/54; C22C 1/026; C22C 21/00
See application file for complete search history.

(56) References Cited

FOREIGN PATENT DOCUMENTS

| CN | 102212724 A | * | 10/2011 |
| GB | 1268812 A | * | 3/1972 |

OTHER PUBLICATIONS

CN 102212724A published Oct. 2011. Machine translation.*
CN 102212724A published Oct. 2011. Abstract.*

* cited by examiner

*Primary Examiner* — George Wyszomierski
*Assistant Examiner* — Tima M McGuthry Banks
(74) *Attorney, Agent, or Firm* — Jackson IPG PLLC; Demian K. Jackson

(57) ABSTRACT

A method for preparing an aluminum-zirconium-boron alloy and synchronously preparing a cryolite is provided. The method includes the following steps: Step A: placing aluminum in a reactor, heating the reactor to 700-850 degrees centigrade, and adding a mixture consisting of fluorozirconate and fluoborate in a molar ratio of x: y into the reactor; Step B: stirring the reactants for 4-6 hours and extracting the upper molten liquid to obtain a cryolite, wherein the lower substance is an aluminum-zirconium-boron alloy, and aluminum is added in an excess amount. The method provided herein for preparing an aluminum-zirconium-boron alloy which is mild in reaction condition, easy to control and simple in technical flow can prepare a high-quality product through a complete reaction, besides, the use of the synchronously prepared low molecular ratio cryolites ($KF·AlF_3$ and $NaF·AlF_3$) in the aluminum electrolysis industry can achieve a proper electrical conductivity.

9 Claims, No Drawings

METHOD FOR PREPARING ALUMINUM-ZIRCONIUM-BORON ALLOY AND SYNCHRONOUSLY PREPARING CRYLITE

FIELD OF THE INVENTION

The disclosure relates to a method for preparing an aluminum-zirconium-boron alloy and synchronously preparing a cryolite and more particularly to a method for preparing an aluminum-zirconium-boron alloy and synchronously preparing a cryolite for use in the aluminum electrolysis industry.

BACKGROUND OF THE INVENTION

Aluminum intermediate alloy, a conventional product mainly used for adjusting alloy components in aluminum melt, is prepared with metal elements relatively high in melting temperature and aluminum using a melting method; as remarkably reduced in melting temperature, the intermediate enables the addition of a metal element relatively high in melting temperature into molten aluminum at a relatively low temperature so as to adjust the element content of aluminum melt. Aluminum can significantly refine pure magnesium grains, and research shows that zirconium can effectively inhibit the growth of magnesium alloy grains to refine the grains and has an allomorphic transformation. Moreover, the addition of boron into an alloy can greatly improve the abrasion resistance, the heat resistance and the thermal shock resistance of the alloy.

Thus, an aluminum-zirconium-boron alloy can improve the high temperature performance and the material property of magnesium and a magnesium alloy to increase the yield of a wrought magnesium alloy and refine grains of the wrought magnesium alloy.

SUMMARY OF THE INVENTION

To address the problems existing in the prior art, the inventor has made a lot of research on an electrolyte selection and preparation method and unexpectedly finds that by preparing an aluminum-zirconium-boron alloy with a raw material of the mixture of fluorozirconate and fluoborate using a thermal chemical synthesis method, the method can prepare an aluminum-zirconium-boron alloy simply and efficiently, and the use of the low molecular ratio sodium cryolite synchronously prepared by the method as the electrolyte of an aluminum electrolysis system can reduce the industrial electrolysis temperature of aluminum electrolysis to reduce power consumption and the overall production cost of sodium cryolite.

A method for preparing an aluminum-zirconium-boron alloy and synchronously preparing a cryolite is provided which includes the following steps:

Step A: placing aluminum in a reactor, heating the reactor to 700-850 degrees centigrade, and adding a mixture consisting of fluorozirconate and fluoborate in a molar ratio of x:y into the reactor; and Step B: Step B: stirring the reactants for 4-6 hours and extracting the upper molten liquid to obtain a cryolite, wherein the lower substance is an aluminum-zirconium-boron alloy, wherein aluminum is added in an excessive amount.

Preferably, in the aluminum-zirconium-boron alloy, zirconium accounts for 1-10% by weight of the aluminum-zirconium-boron alloy, boron accounts for 0.1-3% by weight of the aluminum-zirconium-boron alloy, and the rest is aluminum.

Preferably, the fluorozirconate is potassium fluozirconate, and the fluoborate is potassium fluoborate.

Preferably, the fluorozirconate is sodium fluozirconate, and the fluoborate is sodium fluoborate.

Preferably, the cryolite obtained in Step B is a potassium cryolite the molecular formula of which is $$\frac{3y+6x}{3y+4x} KF \cdot AlF_3.$$

Preferably, the cryolite obtained in Step B is a sodium cryolite the molecular formula of which is $$\frac{3y+6x}{3y+4x} NaF \cdot AlF_3.$$

Preferably, the ratio of x to y is 1:2.
Preferably, the ratio of x to y is 1:1.
The chemical equation involved in the method is as follows:

$$Al(excessive) + xK_2ZrF_6 + yKBF_4 \rightarrow Al \cdot Zr \cdot B(alloy) + \frac{3y+6x}{3y+4x} KF \cdot AlF_3;$$

$$Al(excessive) + xNa_2ZrF_6 + yNaBF_4 \rightarrow$$
$$Al \cdot Zr \cdot B(alloy) + \frac{3y+6x}{3y+4x} NaF \cdot AlF_3.$$

Compared with existing technologies, the disclosure has the following beneficial effects: the method provided herein for preparing an aluminum-zirconium-boron alloy which is mild in reaction condition, easy to control and simple in technical flow can prepare a high-quality product through a complete reaction, besides, the use of the synchronously prepared low molecular ratio cryolites $$\left(\frac{3y+6x}{3y+4x} KF \cdot AlF_3 \text{ and } \frac{3y+6x}{3y+4x} NaF \cdot AlF_3\right)$$

in the aluminum electrolysis industry can achieve a proper electrical conductivity and improve the solubility of aluminum oxide and consequentially reduce electrolysis temperature, lower power consumption, increase electrolysis efficiency and reduce overall preparation cost.

DETAILED DESCRIPTION OF THE PREFERRED EMBODIMENTS

The disclosure is described below in detail with reference to specific embodiments.

Embodiment 1

100 kg aluminum is weighed and placed in a reactor, the reactor is heated to 750 degrees centigrade, a mixture consisting of 141.5 kg potassium fluozirconate and 62.5 kg potassium fluoborate is added into the reactor, the reactants are stirred for 4 hours, then the upper molten liquid, that is, 171 kg potassium cryolite 9/7 $KF \cdot AlF_3$, is pumped out using a siphon pump, and the lower substance is 133 kg aluminum-zirconium-boron alloy.

Embodiment 2

100 kg aluminum is weighed and placed in a reactor, the reactor is heated to 700 degrees centigrade, a mixture consisting of 125.5 kg sodium fluozirconate and 54.5 kg sodium fluoborate is added into the reactor, the reactants are stirred for 6 hours, then the upper molten liquid, that is, 151.5 kg sodium cryolite (9/7 NaF.AlF$_3$), is pumped out, and the lower substance is 128.5 kg aluminum-zirconium-boron alloy.

Embodiment 3

200kg aluminum is weighed and placed in a reactor, the reactor is heated to 800 degrees centigrade, a mixture consisting of 141.5 kg potassium fluozirconate and 62.5 kg potassium fluoborate is added into the reactor, the reactants are stirred for 6 hours, then the upper molten liquid, that is, a potassium cryolite (6/5 KF.AlF$_3$), is pumpedout, and the lower substance is 312kg aluminum-zirconium-boron alloy.

Embodiment 4

200 kg aluminum is weighed and placed in a reactor, the reactor is heated to 850 degrees centigrade, a mixture consisting of 125.5 kg sodium fluozirconate and 109 kg sodium fluoborate is added into the reactor, the reactants are stirred for 5 hours, then the upper molten liquid, that is, a sodium cryolite (6/5 NaF.AlF$_3$), is pumped out, and the lower substance is 300.1 kg aluminum-zirconium-boron alloy.

The above is detailed description of the disclosure with reference to specific preferred embodiments which is not to be construed as limiting the disclosure. The various simple deductions or replacements that can be devised by those of ordinary skill in the art without departing from the concept of the disclosure all fall within the protection scope of the disclosure.

What is claimed is:

1. A method for preparing an aluminum-zirconium-boron alloy and synchronously preparing a cryolite, comprising: the following steps:

Step A: placing aluminum in a reactor, heating the reactor to 700-850 degrees centigrade, and adding a mixture consisting of sodium fluorozirconate and sodium fluoborate in a molar ratio of x: y into the reactor;

Step B: stirring the reactants for 4-6 hours and extracting the upper molten liquid to obtain a sodium cryolite, wherein the lower substance is an aluminum-zirconium-boron alloy, wherein aluminum is added in an excessive amount.

2. The method according to claim 1 wherein in the aluminum-zirconium-boron alloy, zirconium accounts for 1-10% by weight of the aluminum-zirconium-boron alloy, boron accounts for 0.1-3% by weight of the aluminum-zirconium-boron alloy, and the rest is aluminum.

3. The method according to claim 2, wherein the ratio of x to y is 1:2.

4. The method according to claim 2, wherein the ratio of x to y is 1:1.

5. The method according to claim 1, wherein the cryolite obtained in Step B has the molecular formula of $$\frac{3y+6x}{3y+4x} \text{NaF} \cdot \text{AlF}_3.$$

6. The method according to claim 5, wherein the ratio of x to y is 1:2.

7. The method according to claim 5, wherein the ratio of x to y is 1:1.

8. The method according to claim 1, wherein the ratio of x to y is 1:2.

9. The method according to claim 1, wherein the ratio of x to y is 1:1.

* * * * *